United States Patent
Leys

(10) Patent No.: US 11,313,482 B2
(45) Date of Patent: Apr. 26, 2022

(54) WELDED CHECK VALVE

(71) Applicant: ENTEGRIS, INC., Billerica, MA (US)

(72) Inventor: John A. Leys, Chaska, MN (US)

(73) Assignee: ENTEGRIS, INC., Billerica, MA (US)

( * ) Notice: Subject to any disclaimer, the term of this patent is extended or adjusted under 35 U.S.C. 154(b) by 152 days.

(21) Appl. No.: 16/683,491

(22) Filed: Nov. 14, 2019

(65) Prior Publication Data

US 2021/0148474 A1 May 20, 2021

(51) Int. Cl.
*F16K 15/02* (2006.01)
*B23P 15/00* (2006.01)

(52) U.S. Cl.
CPC .......... *F16K 15/028* (2013.01); *B23P 15/002* (2013.01)

(58) Field of Classification Search
CPC .... F16K 15/026; F16K 15/028; F16K 15/063; F16K 27/10; F16K 27/102; Y10T 137/6086
See application file for complete search history.

(56) References Cited

U.S. PATENT DOCUMENTS

| 3,209,777 | A | * | 10/1965 | Salisbury | F16K 15/026 137/315.33 |
|---|---|---|---|---|---|
| 3,598,145 | A | | 8/1971 | Wolfson | |
| 3,872,884 | A | | 3/1975 | Busdiecker | |
| 3,957,319 | A | | 5/1976 | Gorski | |
| 4,343,456 | A | | 8/1982 | Zitzloff | |
| 4,532,958 | A | * | 8/1985 | Napolitano | F16K 15/063 137/454.2 |
| 4,850,393 | A | | 7/1989 | Lashomb | |
| 4,929,293 | A | | 5/1990 | Osgar | |
| 5,090,446 | A | * | 2/1992 | Hunter | A01G 25/16 137/540 |
| 5,669,412 | A | | 9/1997 | Scott | |
| 6,039,073 | A | | 3/2000 | Messick | |
| 6,199,582 | B1 | | 3/2001 | Matsuzawa | |
| 6,401,749 | B1 | | 6/2002 | Tai | |
| 6,443,182 | B1 | * | 9/2002 | Hathcock | F16K 15/063 137/514.5 |
| 8,230,875 | B2 | * | 7/2012 | Norman | F16K 27/0209 137/315.33 |

(Continued)

FOREIGN PATENT DOCUMENTS

| JP | S5550348 U | 4/1980 |
|---|---|---|
| JP | H0530652 U | 4/1993 |

(Continued)

*Primary Examiner* — Kevin F Murphy
(74) *Attorney, Agent, or Firm* — Entegris, Inc.

(57) ABSTRACT

Welded check valves include a poppet assembly, a spring, and a disc that contacts the spring. The disc may be held at a position away from a weld when forming the welded check valve. Embodiments may include retention features configured to allow one or more of the poppet assembly and disc to pass the retention features in an assembly orientation, and to retain those elements when they are in an operational orientation. Methods include inserting the poppet assembly, contacting the poppet assembly with a spring, inserting a disc, retaining the disc away from a weld side, and welding the check valve together. The poppet assembly and/or disc may pass one or more retaining features when inserted, and be retained by the retaining features when the check valve is operated. The weld may be a thermal weld.

16 Claims, 5 Drawing Sheets

(56) References Cited

U.S. PATENT DOCUMENTS

| | | | |
|---|---|---|---|
| 8,689,817 B2* | 4/2014 | Leys | F16K 27/102 |
| | | | 137/315.05 |
| 9,404,244 B1* | 8/2016 | Gass | F16K 15/063 |
| 9,599,240 B2 | 3/2017 | Nguyen | |
| 2003/0213479 A1 | 11/2003 | Wade | |
| 2005/0028885 A1* | 2/2005 | Zapp | F16K 15/026 |
| | | | 141/59 |
| 2008/0142102 A1 | 6/2008 | Savard | |
| 2013/0092261 A1* | 4/2013 | Andersson | F16K 15/06 |
| | | | 137/511 |
| 2018/0003317 A1 | 1/2018 | Iguchi | |

FOREIGN PATENT DOCUMENTS

| | | |
|---|---|---|
| JP | H0635750 U | 5/1994 |
| JP | 2001182852 A | 7/2001 |

* cited by examiner

WELDED CHECK VALVE

FIELD

This disclosure is directed to check valves, particularly welded check valves.

BACKGROUND

Check valves allow flow of a fluid in only a single direction, obstructing flow in the opposite direction to that single direction of permitted flow.

Check valves typically are assembled by arranging the internal components and screwing together the pieces that form the outer body of the check valve. Machining of the screws can be costly, and temperature variations can lead to media leakage at the screwed joint of the check valve.

SUMMARY

This disclosure is directed to check valves, particularly polymeric components welded together to create check valves. Welding the polymeric components of check-valves together simplifies manufacture of check valve components while producing a higher quality seal. Additionally, the elimination of threaded connections reduces potential particle generation caused during assembly of threaded components. Thus, welded check valves may offer improved performance in high-purity such as controlling fluid flows during semiconductor manufacture. Check valves may be welded using thermal welding techniques. Such thermal welding may be enabled by the inclusion of retaining features that allow polymeric check valve components to be held away from the site of the weld or the seam. Holding the check valve components away from the weld site can prevent the welding process from damaging or improperly bonding melt processable components of the check valve.

A check valve embodiment includes an internal passage, and is configured to control a fluid flow through the internal passage. The check valve includes an internal assembly. The internal assembly has a poppet assembly, a spring, contacting the poppet assembly at a first end, a disc including one or more through holes, the disc contacting the spring, a first outer piece having a first aperture and an opening opposite the first aperture, a second outer piece having a second aperture and a second opening opposite the second aperture. The second outer piece is joined to the first outer piece by a weld at the opening opposite the second aperture. The first outer piece and the second outer piece define an internal space for retaining the internal assembly. A disc retaining feature is located within the internal space, the retaining feature configured to selectively retain the disc in a position within the first outer piece away from the weld. This feature advantageously retains the internal components of the check valve away potentially damaging heat during the welding process. The internal assembly is configured to obstruct a fluid flow through the internal passage in one direction and permit flow through the internal passage in an opposite direction.

In an embodiment, the check valve includes a poppet assembly retaining feature. The poppet assembly retaining feature includes a plurality of retaining ribs extending from the first outer piece into the internal space, wherein the retaining ribs of the first plurality of retaining ribs are separated from one another by a first plurality of gaps, and each of the plurality of gaps is larger than a thickness of an outermost edge of the poppet assembly.

In an embodiment, the outermost edge of the poppet assembly defines a diameter that is smaller than a diameter of the internal space and larger than a distance between opposing retaining features of the plurality of retaining ribs.

In an embodiment, the poppet assembly includes a poppet and a poppet assembly disc, the poppet assembly disc includes one or more through holes, and the poppet assembly disc includes the outer edge of the poppet assembly.

In an embodiment, the plurality of retaining ribs is an even number of the retaining ribs and the plurality of gaps is an even number of the gaps.

In an embodiment, the disc retaining feature includes a plurality of retaining ribs extending from the first outer piece into the internal space. The retaining ribs of the second plurality of retaining ribs are separated from one another by a second plurality of gaps, and each of the second plurality of gaps is longer than a thickness of the outermost edge of the poppet assembly and a thickness of the disc.

In an embodiment, the disc retaining feature includes one or more detents formed on an inner surface of the first outer piece. In an embodiment, the detents do not allow the disc to pass when an outer surface of the first outer piece is compressed and allow the disc to pass when the outer surface of the first outer piece is not compressed.

In an embodiment, the first outer piece includes an annular groove formed on an inner surface of the first outer piece. In an embodiment, the disc retaining feature is a snap ring configured to be inserted into the annular groove, wherein when the snap ring is inserted into the annular groove, the snap ring has an interior diameter that is smaller than an outer diameter of the disc. In an embodiment, the disc is configured to be inserted into the annular groove and the annular groove is the retaining feature.

In an embodiment, the first outer piece, second outer piece, poppet assembly, and spring each comprise one or more fluoropolymers. The fluoropolymers may be melt processable.

In an embodiment, a method of assembling a check valve includes inserting a poppet assembly into a first outer piece of the check valve, the first outer piece including an inlet of the check valve, placing a spring against the poppet assembly, inserting a disc, such that the disc contacts the spring, and welding the first outer piece to a second outer piece at a weld joint. The disc is retained in a position away from the weld joint during the welding by one or more features of the first outer piece of the check valve.

In an embodiment, the disc is retained by a retaining feature including a plurality of retaining ribs on an inner surface of the first outer piece, wherein during the inserting of the disc, the disc is rotated such that the outer edges of the disc pass through gaps between ribs of the plurality of retaining ribs, and the method further comprises rotating the disc such that the disc contacts the plurality of retaining ribs.

In an embodiment, during the inserting of the poppet assembly, the poppet assembly is rotated such that the outer edges of the poppet assembly pass through gaps between ribs of the plurality of retaining ribs.

In an embodiment, during the inserting of the poppet assembly, the poppet assembly passes a second retaining feature, the second retaining feature comprising a plurality of second retaining ribs, and the method further includes rotating the poppet assembly such that when the poppet assembly moves along the axis of the first outer piece away from the inlet of the check valve, the poppet assembly is capable of contacting the plurality of second retaining ribs.

In an embodiment, the method further includes moving the disc such that it is retained by a plurality of retaining ribs proximal to the weld, after the welding of the first outer piece to the second outer piece.

In an embodiment, welding the first outer piece to the second outer piece includes thermal welding.

In an embodiment, the thermal welding includes heating a welding surface of the first outer piece using a first side of a heating paddle, heating a welding surface of the second outer piece using a second side of the heating paddle, and pressing the welding surface of the first outer piece and the welding surface of the second outer piece together.

In an embodiment, the method further includes testing flow through the first outer piece in a first direction and testing flow through the first outer piece in a second direction, opposite the first, after inserting the disc and prior to the welding.

DRAWINGS

DETAILED DESCRIPTION

This disclosure is directed to check valves, particularly welded check valves.

Figure 1:
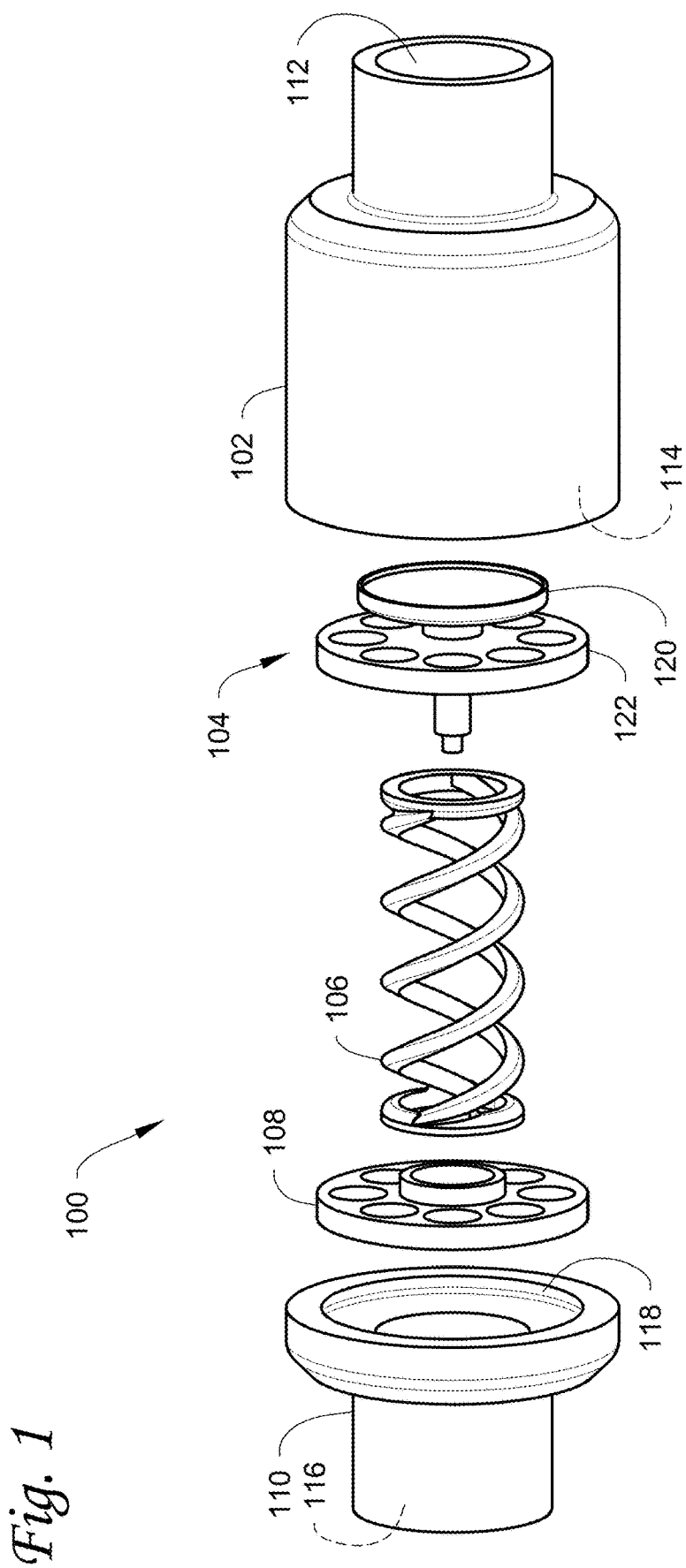
FIG. 1 shows an exploded view of a check valve according to an embodiment.

FIG. 1 shows an exploded view of a welded check valve according to an embodiment. Welded check valve 100 includes first outer piece 102, poppet assembly 104, spring 106, disc 108, and second outer piece 110. First outer piece 102 includes an aperture 112 and an opening 114. Second outer piece 110 includes aperture 116 and opening 118. When assembled, opening 114 of first outer piece 102 is welded to the opening 118 of second outer piece 110.

First outer piece 102 defines part of the body of check valve 100. First outer piece 102 includes an aperture 112. In the embodiment shown in FIG. 1, aperture 112 forms an inlet of the check valve 100 and is part of an internal channel through the check valve 100. First outer piece 102 includes opening 114. An inner surface of first outer piece 102 may include retaining features (not shown) to position or restrict movement of one or more of poppet assembly 104 or disc 108.

Poppet assembly 104 is configured to fit within first outer piece 104. Poppet assembly 104 includes a poppet 120 and a poppet assembly disc 122.

In poppet assembly 104, the poppet 120 is configured to obstruct flow through the aperture 112 when the poppet 120 is positioned against it, for example by force from spring 106 or pressure provided by flow through check valve 100 towards aperture 112. The poppet 120 is configured to be pushed away when a flow entering through aperture 112 provides more force than that provided by spring 106. The poppet is configured to allow flow in one direction, from aperture 112 towards opening 118 of the, and block flow in the opposite direction.

In poppet assembly 104, poppet assembly disc 122 is a circular disc having a diameter such that it can fit inside first outer piece 102. Poppet assembly disc 122 may have a diameter that allows poppet assembly 104 to be retained by one or more retaining features within first outer piece 102.

Poppet assembly disc 122 includes one or more through holes allowing fluid to pass through. Poppet assembly disc may be configured such that the travel of the poppet assembly 104 is restricted by one or more retaining features provided on an inner surface of first outer piece 102.

In an embodiment, poppet assembly 104 is formed integrally, with the poppet assembly disc being an extension from the poppet. In an embodiment, poppet assembly 104 includes a poppet assembly disc that is separate component from the poppet, and the poppet and poppet assembly disc are fixed to one another, for example via a mechanical interface, an adhesive, or any suitable methods of joining or combinations thereof.

Spring 106 may be a spring configured to contact poppet assembly 104 and disc 108. Spring 106 is configured such that it is compressed between poppet assembly 104 and disc 108. Spring 106 presses poppet assembly 104 against aperture 112 when unopposed by a force acting on poppet assembly 104. The force with which spring 106 presses poppet assembly 104 may be a small force that is readily overcome by the pressure of flow through aperture 112. It is understood that a person having ordinary skill in the art can select an appropriate spring force for operation of the check valve. In an embodiment, spring 106 may be selected such that a flow from aperture 112 providing less than approximately 1 psi of pressure may cause spring 106 to be compressed and poppet assembly 104 moved to allow flow through the check valve 102. Spring 106 may be a molded polymer spring.

Disc 108 is used to retain spring 106 and position spring 106 such that spring 106 presses the poppet assembly 104. Disc 108 includes one or more through holes allowing fluid to pass through disc 108. Disc 108 is configured to fit within first outer portion 102. In an embodiment, disc 108 is configured to be retained by a retaining feature located within first outer portion 102. In an embodiment, disc 108 has an outer diameter that is smaller than the diameter within first outer portion 102, but larger than a distance between two opposing points on one or more retaining features within first outer portion 102.

Second outer piece 110 combined with first outer piece 102 form the body of check valve 100. Second outer piece 110 includes aperture 116 and opening 118. In an embodiment, aperture 116 is an outlet of the check valve. Opening 118 is at an end of the second outer piece opposite the aperture 116. Opening 118 may be surrounded by a welding surface.

When assembled, opening 114 of first outer piece 102 is welded to the opening 118 of second outer piece 110. Prior to welding, ends 114 and 118 may each include a flat welding surface, and the welding surfaces may have corresponding sizes and shapes. In an embodiment, welding surfaces at the ends 114 and 118 match one another such that they completely contact one another. The weld may be, for example, a thermal weld. The weld may be formed by gripping each of first outer piece 102 and second outer piece 104, for example via a clamp or a vise, heating each of ends 114 and 118, for example using a heated paddle, aligning the ends 114 and 118 with one another, and pressing together the heated ends 114 and 118. In an embodiment, following the welding of ends 114 and 118, disc 108 may be released from one set of retaining features within first outer piece 102. An example of a thermal welding process is disclosed in U.S. Pat. No. 4,929,293, herein incorporated by reference in its entirety.

In an embodiment, all components of the check valve 100 may be made of polymer materials. In an embodiment, all components of check valve 100 are made of the same polymer material. In an embodiment, at least some of the components of check valve 100 may be made of different fluoropolymers from one another. In an embodiment, the polymer material is a fluoropolymer. Examples of fluoropolymers used to form the components may include, but are not limited to, fluoropolymers such as perfluoroalkoxy alkane polymer (PFA), ethylene and tetrafluoroethylene polymer (ETFE), ethylene, tetrafluoroethylene and hexafluoropropylene polymer (EFEP), polychlorotrifluoroethylene (PCTFE) and fluorinated ethylene propylene polymer (FEP), all of which are melt-processable. In addition to providing a non-corrosive and inert construction, many fluoropolymers, such as PFA, are injection moldable and extrudable. In one preferred embodiment, the fluoropolymer is perfluoroalkoxy alkane polymer (PFA). In other embodiments, the fluoropolymer can be polytetrafluoroethylene (PTFE) or tetrafluoroethylene polymer (PTFE) or modified tetrafluoroethylene polymer (TFM), which are not melt-processable, but can be compression molded and machined.

Figure 2:
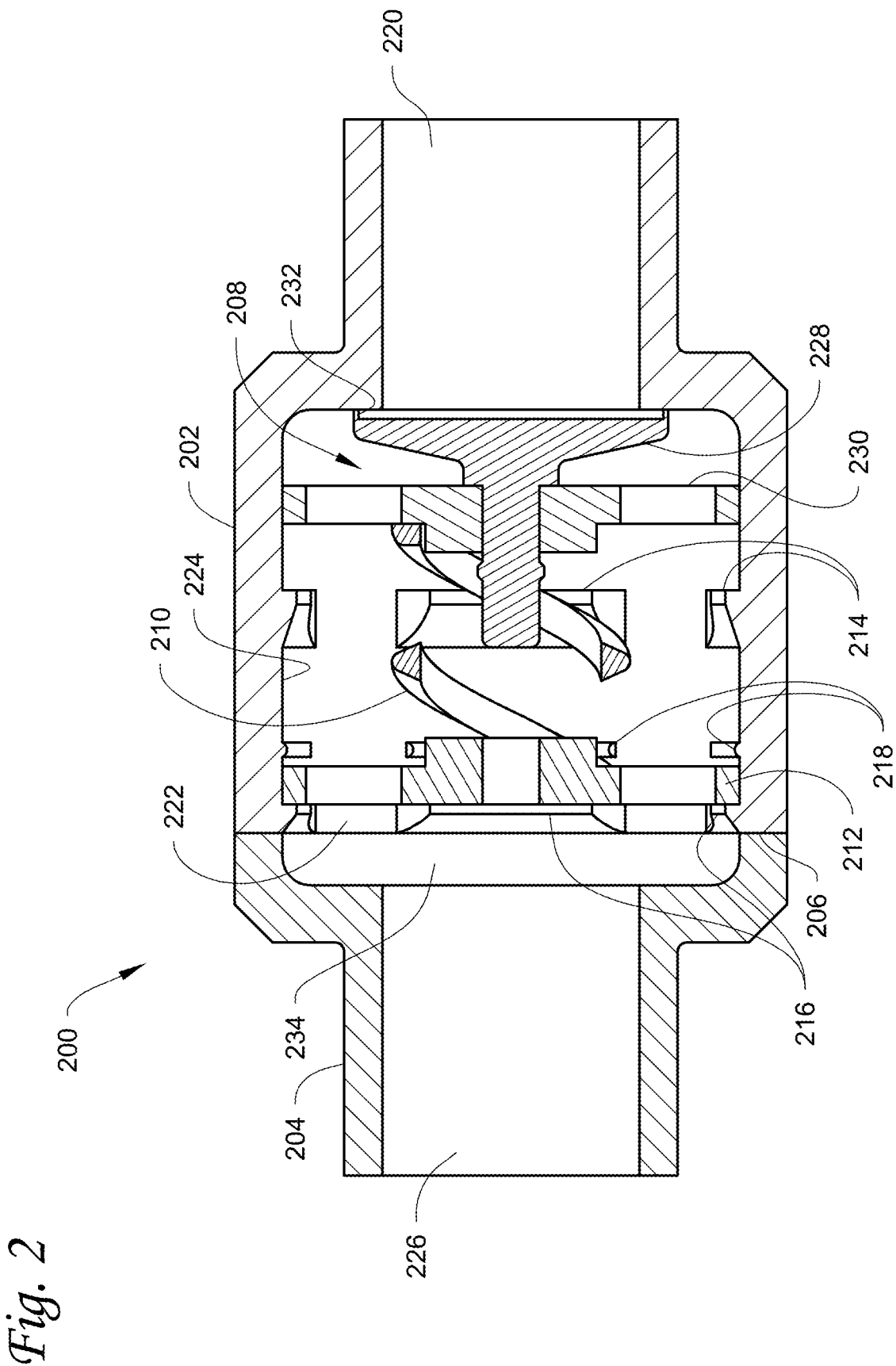
FIG. 2 shows a sectional view of a check valve according to an embodiment.

FIG. 2 shows a sectional view of a check valve 200 according to an embodiment. In the embodiment shown in FIG. 2, first outer piece 202 is joined to second outer piece 204 at weld 206. First outer piece 202 and second outer piece 204 define an internal space containing poppet assembly 208, spring 210, and disc 212. The internal surface of first outer piece 202 includes poppet assembly retaining features 214, disc retaining features 216, and welding disc retaining features 218.

First outer piece 202 is part of the body of check valve 200. First outer piece 202 includes an aperture 220 at one end, and an opening 222 at the opposite end. A welding surface may surround opening 222. The first outer piece 202 has an internal space between aperture 220 and opening 222. This internal space is part of an internal passage through the check valve 200. The internal space is defined by an inner surface 224 of the first outer piece.

Second outer piece 204 is another part of the body of check valve 200. Second outer piece 204 includes an aperture 226 at one end and an opening 234 at the opposite end.

Weld 206 joins first outer piece 202 and second outer piece 204 such that they define an internal space. The internal space contains an internal assembly including poppet assembly 208, spring 210, and disc 212. The weld may be any suitable weld joining first outer piece 202 and second outer piece 204. Suitable welds may include, for example, a thermal weld or an ultrasonic weld. In an embodiment, weld 206 is a thermal weld.

Poppet assembly 208 may include poppet 228 and poppet assembly disc 230. In an embodiment, poppet 228 and poppet assembly disc 230 are separate components joined to one another, for example by one or more of mechanical interface, adhesives, or any other suitable method of fixing parts to one another.

In the embodiment shown in FIG. 2, poppet 228 may include a lip 232 extending from the outer perimeter of the poppet 228 towards aperture 220. The lip 232 may form a sealing surface when poppet 228 is prohibiting flow towards that aperture 220. The lip 232 may be flexible to form the sealing surface. The lip 232 may be configured to interface with an internal surface of first outer piece 202 to form a seal preventing the flow of fluid past the poppet 228 towards the aperture 220. The poppet 228 may have a diameter that exceeds the diameter of a channel to the aperture 220 towards which poppet 228 restricts flow. When flow is coming from aperture 220 and directed towards aperture 226, the flow may apply pressure to the poppet such that the poppet assembly moves towards aperture 226, compressing spring 210. This positions the poppet assembly such that flow from aperture 220 may pass poppet 228. The flow then passes through the through holes formed in poppet assembly disc 230 and disc 212, passing through the internal space within check valve 200 to aperture 226.

Poppet assembly disc 230 is a circular disc having a diameter such that it can fit inside first outer piece 202. Poppet assembly disc 230 may have a diameter that allows poppet assembly 208 to be retained by one or more poppet assembly retaining features 214 when in an operational position. Poppet assembly disc 230 includes one or more through holes allowing fluid to pass through. Poppet assembly disc 230 may be configured such that poppet assembly 208 may travel in a direction towards or away from aperture 226 with respect to aperture 220. The direction of travel of poppet assembly 208 may be in a direction of flow of fluid through the internal space of check valve 200 at the poppet assembly 208. The travel of poppet assembly 208 may be restricted by one or more poppet assembly retaining features 214 provided on an inner surface 224 of first outer piece 202.

Spring 210 is a spring configured to contact poppet assembly 208 and disc 212. Spring 210 is configured such that it presses poppet assembly 208 to obstruct aperture 220 when unopposed. The force with which spring 210 presses poppet assembly 208 may be a small force that is readily overcome by the pressure of flow through aperture 220. Spring 210 may be a molded polymer spring.

Disc 212 secures spring 210 such that spring 210 can apply force to poppet assembly 208. Disc 212 is held in position by disc retaining features 216. Disc 212 includes one or more through holes configured to allow fluid to pass through disc 212. In an embodiment, disc 212 is configured to be retained by disc retaining features 216. In an embodiment, disc 212 has an outer diameter that is smaller than the diameter of the internal space within first outer portion 202, but larger than a distance between two points of the disc retaining features 216 opposing one another with respect to a center line of the internal space within first outer piece 202.

The inner surface 224 of first outer piece 202 includes poppet assembly retaining features 214. In the embodiment shown in FIG. 2, the poppet assembly retaining features are formed integrally with the inner surface 224 of first outer piece 202 and extend inwardly from that surface. In this embodiment, the poppet assembly retaining features may be two or more ribs, the ribs separated by two or more gaps between them. The ribs may project inwards such that the distance between points on the ribs that oppose one another with respect to a center of the internal space within first outer piece 202 is smaller than an outer diameter of the poppet assembly disc 230. In an embodiment, the poppet assembly retaining features 214 may be a snap ring or included on a snap ring that is inserted into a groove formed on inner surface 224 of first outer piece 202. Poppet assembly retaining features 214 may be closer to the aperture 220 and further from aperture 226 of the first outer piece 202 than other retaining features such as disc retaining features 216 or welding disc retaining feature 218.

In the embodiment shown in FIG. 2, disc retaining features 216 are included in inner surface 224 of first outer piece 220. The disc retaining features 216 may be formed integrally with first outer piece 202. In this embodiment, the disc retaining features may be two or more ribs, the ribs separated by two or more gaps between them. The ribs may project inwards such that the distance between points on the ribs that oppose one another with respect to a center of the internal space within first outer piece 202 is smaller than an outer diameter of the disc 212. In an embodiment, the disc retaining features 216 may be a snap ring or included on a snap ring that is inserted into a groove formed on inner surface 224 of first outer piece 202. Disc retaining features 216 may be closer to the aperture 226 and further from aperture 220 of the first outer piece 202 than other retaining features such as poppet assembly retaining features 214 or welding disc retaining feature 218.

FIG. 2 shows optional welding disc retaining feature 218. In the embodiment shown in FIG. 2, welding disc retaining feature 218 is an annular ridge projecting from the inner surface 224 of first outer piece 202, located between the poppet assembly retaining features 214 and the disc retaining features 216 along the length of the first outer piece 202. In an embodiment, welding disc retaining feature 218 is a detent. In an embodiment, welding disc retaining feature 218 is sized to provide an interference fit, such that the disc 212 may be pushed past the welding disc retaining feature 218 when force is applied to disc 212. In this embodiment, when no outside force is applied to disc 212 beyond spring 210, the interference fit does not allow disc 212 to pass the welding disc retaining feature 218. In an embodiment, welding disc retaining feature 218 is sized such that disc 212 may pass the welding disc retaining feature 218 when no pressure is applied to an exterior of first outer piece 202, but that when pressure is applied to the exterior of the first outer piece 202, welding disc retaining feature 218 provides sufficient friction to hold disc 212 in place or prohibit the passage of disc 212 towards the opening 222. Welding disc retaining feature 218 may be used to secure disc 212 at a position further from the weld during the weld, then release the disc 212 and allow the disc 212 to move to disc retaining features 216 once the check valve 200 is assembled and ready for use.

The internal assembly including poppet assembly 208, spring 210, and disc 212 is configured to obstruct a fluid flow through the internal passage in one direction and permit flow through the internal passage in an opposite direction. In an embodiment, when fluid is flowing from aperture 220 of the first outer piece 202 towards aperture 226 of the second outer piece 204, the fluid flow applies pressure overcoming the spring force provided by spring 210, causing poppet assembly 208 to move away from aperture 220 and towards aperture 226. This positions poppet 228 such that it does not obstruct flow from aperture 220, and flow passes poppet 228 and through the through holes formed in poppet assembly disc 230 and disc 212 to aperture 226. When flow is in the opposite direction, from aperture 226 towards aperture 220, spring 210 acts on poppet assembly 208 and positions the poppet 228 such that it obstructs flow to aperture 220. The pressure of the flow from aperture 226 towards aperture 220 also presses on poppet 228, sealing it in position and prohibiting flow to aperture 220. The embodiment shown in FIG. 2 thus provides flow in only one direction through the internal space within check valve 200, and obstructs flow in the opposite direction.

In an embodiment, all components of the check valve 200 may be made of polymer materials. In an embodiment, all components of check valve 200 are made of the same polymer material. In an embodiment, at least some of the components of check valve 200 may be made of different fluoropolymers from one another. In an embodiment, the polymer material is a fluoropolymer. Examples of fluoropolymers used to form the components may include, but are not limited to, fluoropolymers such as perfluoroalkoxy alkane polymer (PFA), ethylene and tetrafluoroethylene polymer (ETFE), ethylene, tetrafluoroethylene and hexafluoropropylene polymer (EFEP), polychlorotrifluoroethylene (PCTFE) and fluorinated ethylene propylene polymer (FEP), all of which are melt-processable. In addition to providing a non-corrosive and inert construction, many fluoropolymers, such as PFA, are injection moldable and extrudable. In one preferred embodiment, the fluoropolymer is perfluoroalkoxy alkane polymer (PFA). In other embodiments, the fluoropolymer can be polytetrafluoroethylene (PTFE) or tetrafluoroethylene polymer (PTFE) or modified tetrafluoroethylene polymer (TFM), which are not melt-processable, but can be compression molded and machined.

FIGS. 3A-3H show the steps of an example of inserting a poppet assembly 302, spring 304 and disc 306 into a first outer piece 300 of a check valve according to an embodiment.

Figure 3B:
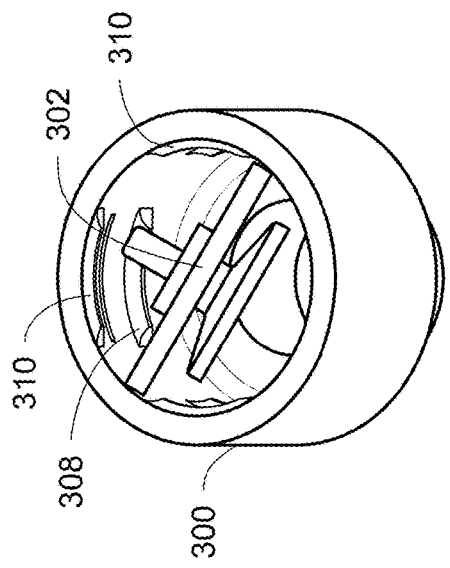
FIGS. 3A-3H show the steps of an example of inserting a poppet, spring and disc into a check valve according to an embodiment.
Figure 3D:
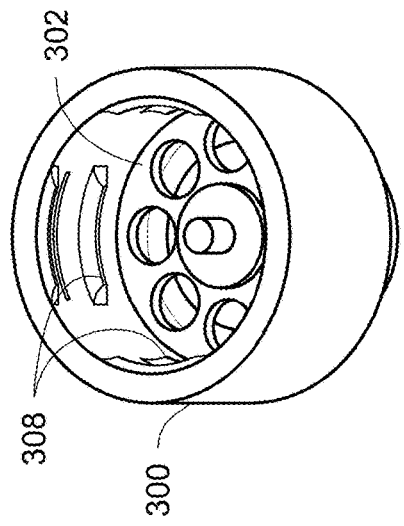
Figure 3A:
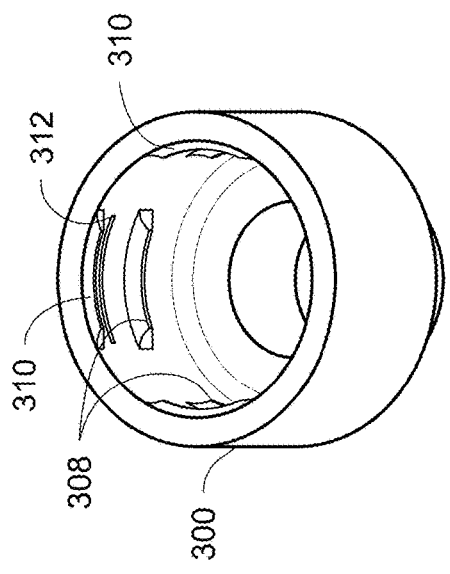

FIG. 3A shows the first outer piece 300 of the check valve that is provided in a method of assembling a valve according to an embodiment. Poppet assembly retaining features 308, disc retaining features 310, and welding disc retaining feature 312 can be seen within first outer piece 300.

Poppet assembly retaining features 308 include a plurality of ribs located towards the aperture formed in first outer piece 300 and further from the open end in the embodiment shown in FIG. 3A. The plurality of ribs include a plurality of gaps extending inwards from an inner surface of first outer piece 300. In an embodiment, the poppet assembly retaining features 308 may be at least two ribs, with at least two gaps formed between the at least two ribs. The ribs may be formed integrally with first outer piece 300. Each of the plurality of gaps is sized such that the poppet assembly 302 may pass the poppet assembly retaining features 308 when the poppet assembly 302 is rotated with respect to its operation position. In an embodiment, the ribs may be included on a snap ring inserted into a groove formed in first outer piece 300. In an embodiment, the poppet assembly retaining features 308 are replaced by a groove configured to accept a snap ring, the inner diameter of the snap ring being smaller than an inner diameter of the internal space within first outer piece 300.

Disc retaining features 310 include a plurality of ribs located towards the open end and further from the aperture formed in first outer piece 300 in the embodiment shown in FIG. 3A. The plurality of ribs are separated by a plurality of gaps extending inwards from an inner surface of first outer piece 300. In an embodiment, the disc retaining features 310 may be at least two ribs, with at least two gaps formed between the at least two ribs. Each of the plurality of gaps is sized such that the poppet assembly 302 and the disc 306 may each pass the disc retaining features 310 when the poppet assembly 302 or disc 306 are rotated with respect to their operational positions. The ribs may be formed integrally with first outer piece 300. In an embodiment, the ribs may be included on a snap ring inserted into a groove formed in first outer piece 300. In an embodiment, the disc retaining features 310 are replaced by a groove configured to accept a snap ring, the inner diameter of the snap ring being smaller than an inner diameter of the internal space within first outer piece 300.

The embodiment shown in FIG. 3A further includes optional welding disc retaining feature 312. In the embodiment shown in FIG. 3A, the welding disc retaining feature 312 is a small projection from the inner surface of first outer piece 300, located between the poppet assembly retaining features 308 and the disc retaining features 310. Welding disc retaining feature 312 is sized such that disc 308 may pass the welding disc retaining feature 312 when no pressure is applied to an exterior of first outer piece 300, but that when pressure is applied to the exterior of the first outer piece 300, welding disc retaining feature 312 provides sufficient friction to hold disc 308 in place or prohibit the passage of disc 308 towards the open end of first outer piece 300. Welding disc retaining feature 312 may be used to secure disc 308 at a position further from the weld during the weld, then allow the disc 308 to advance to disc retaining features 310 once the check valve is assembled and ready for use. The position of the disc when held by welding disc retaining feature 312 may be seen in FIG. 3H.

FIG. 3B shows insertion of a poppet assembly 302 into the first outer piece 300. The poppet assembly is rotated such that the poppet assembly disc may pass through gaps between the disc retaining features 310 and through gaps between the poppet assembly retaining features 308. The poppet assembly thus can be positioned opposite the open end of first outer piece 300 towards the aperture formed in first outer piece 300.

Figure 3C:
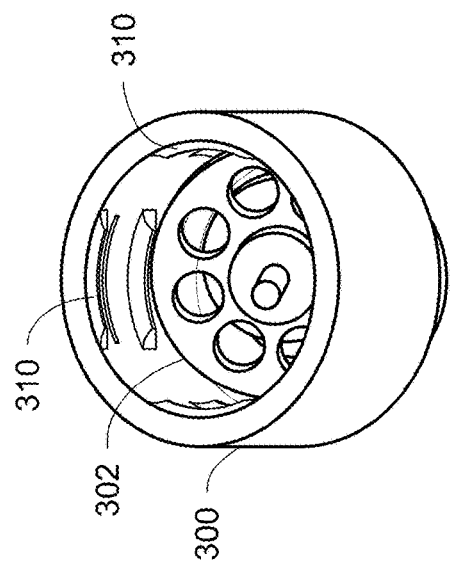

FIGS. 3C and 3D show rotation of the poppet assembly 302 into an operating position. The poppet assembly 302 is in the process of being rotated in FIG. 3C, and fully rotated in FIG. 3D. The poppet assembly in FIG. 3D is in the operational positon, where the plane of the disc included in poppet assembly 302 perpendicular to the direction fluid would enter through the aperture formed in first outer piece 300. In the operational position, poppet assembly 302 may be slidable between a closed position where the poppet covers the fluid path to an aperture of the first outer piece 300 and a fully open position where the poppet assembly contacts the poppet assembly retaining features 308.

In an embodiment where the poppet assembly retaining features 308 include or are a snap ring, poppet assembly 302 may be placed into first outer piece 300 in the operating position shown in FIG. 3D without rotation as shown in FIGS. 3B and 3C, and the snap ring subsequently inserted into first outer piece 300 and snapped into the groove.

Figure 3F:
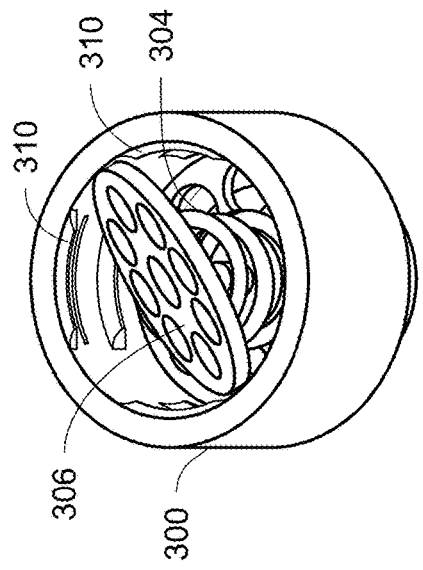
Figure 3H:
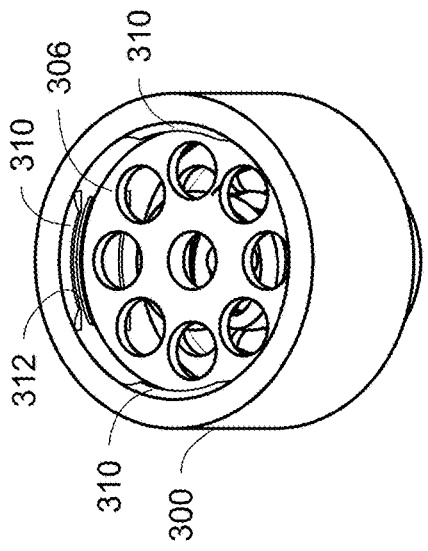
Figure 3E:
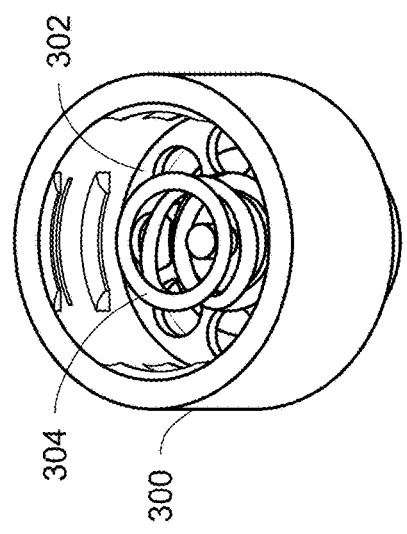

FIG. 3E shows placement of the spring into contact with the poppet assembly. The spring is directly inserted into the first outer piece 300 and an end of the spring 304 contacts the poppet assembly 302.

FIG. 3F shows insertion of the disc 306 into the check valve. The insertion of disc 306 shown in FIG. 3F is performed while spring 304 is in position contacting poppet assembly 302. The disc is rotated such that the outermost edges of the disc can pass through the gaps in the disc retaining features 310 during insertion.

Figure 3G:
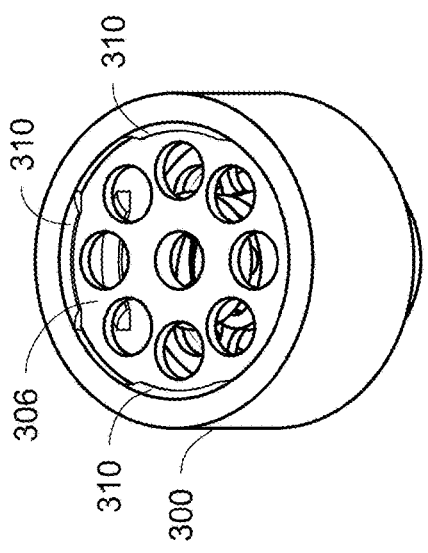

FIG. 3G shows the disc 306 in an operational position, retained by the disc retaining features 310. The disc is rotated such that the outermost edges of the disc 306 can contact the disc retaining features 310. In the operational position, spring 304 presses disc 306 against the disc retaining features 310, such that the disc 306 is positioned against the disc retaining features 310 and spring 304 can apply force against poppet assembly 302.

In an embodiment where the disc retaining features 310 are or include a snap ring, disc 306 may be placed against spring 304 in the operational position shown in FIG. 3, then the snap ring inserted into a groove at the position of the disc retaining features 310.

FIG. 3H shows the disc 306 moved to an optional position for welding, further from the welding surface on the end of the first outer piece 300. The first outer piece 300 and the components retained therein may then be welded to a second outer piece (not shown) to form a check valve. To achieve the position of the disc 306 shown in FIG. 3H, the disc 306 in the operational position shown in FIG. 3G is pressed towards the poppet assembly 304 and held in that position with the spring compressed. The optional welding disc retaining feature 312 may provide an interference fit with disc 306. In an embodiment, the disc 306 may be pressed past the optional welding disc retaining feature 312 by application of force on disc 306. In an embodiment, the interference fit of retaining feature 312 may retain disc 306 when disc 306 is not subject to force outside of that provided by spring 304. In an embodiment, the interference fit of optional welding disc retaining feature 312 and disc 306 may be affected by external force on first outer piece 300. In this embodiment, while the disc 306 is in this position, the first outer piece 300 may have pressure applied to an exterior surface, for example via a clamp such as a clamp used to secure the piece for welding. The disc 306 may then be released while the pressure is applied to the external surface, with spring 304 applying force that moves disc 306 to the welding disc retaining feature 312, where friction or mechanical interference retains disc 306 while the pressure is applied to the external surface. Once the pressure is removed, disc 306 may be able to pass welding disc retaining feature 312 and be retained instead by disc retaining features 310.

Figure 4:
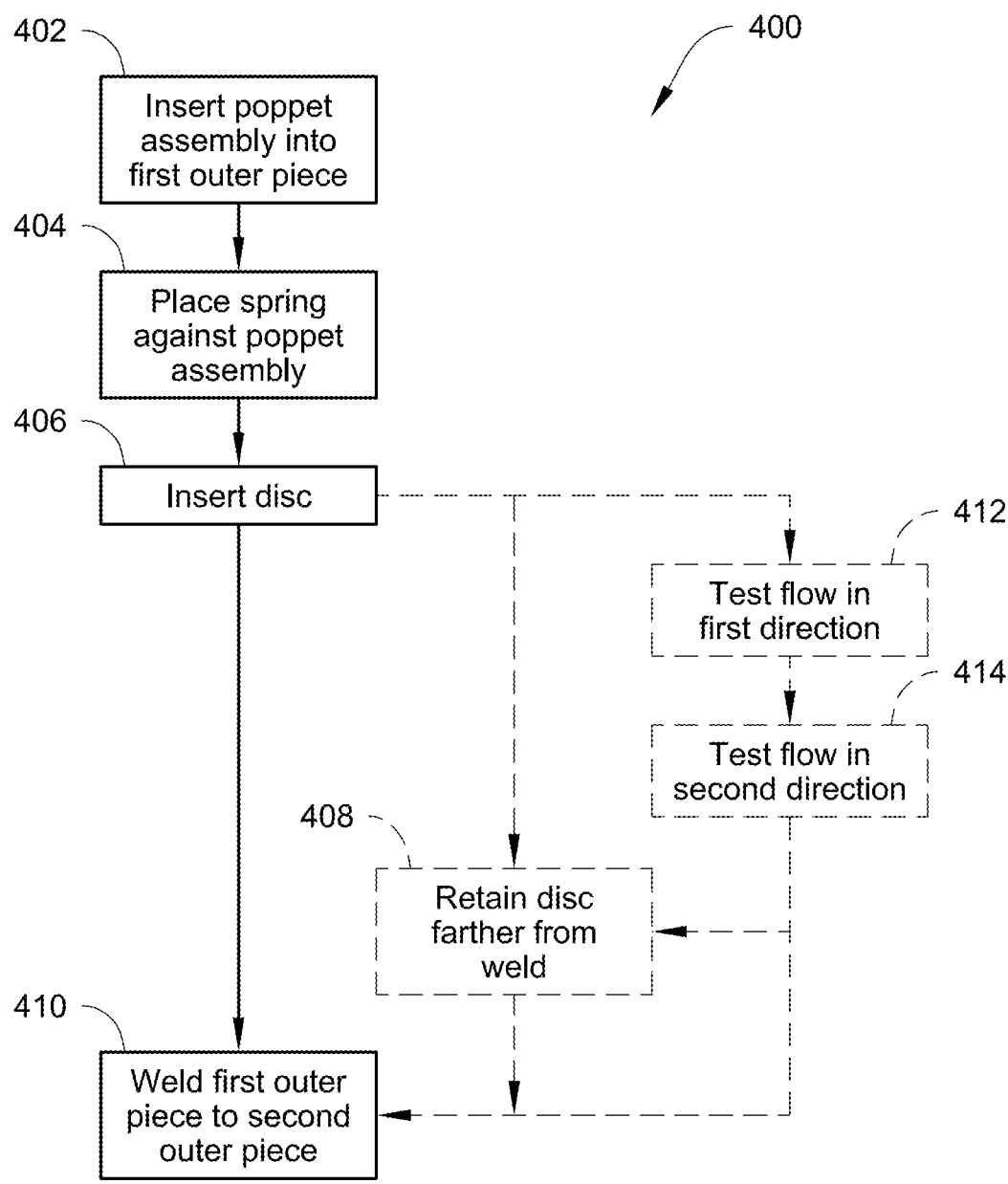
FIG. 4 shows a flow chart of a method according to an embodiment.

FIG. 4 shows a flow chart of a method 400 according to an embodiment. Method 400 includes inserting a poppet assembly into a first outer piece of the check valve 402, placing a spring against the poppet assembly 404, and inserting a disc 406. Optionally, method 400 includes moving the disc such that it is retained further from the weld 408 than an operating position of the disc. Method 400 further includes welding the first outer piece to a second outer piece at a weld joint 410. In an embodiment, method 400 optionally includes testing flow through the first outer piece in a first direction 412 and testing flow through the first outer piece in a second direction, opposite the first 414, after inserting the disc and prior to the welding.

Inserting a poppet assembly into a first outer piece of the check valve 402 includes placing the poppet assembly into the first outer piece. In an embodiment, the poppet assembly may be rotated such that the outermost edge of the poppet assembly may pass poppet assembly retaining features, such as by passing through gaps between ribs included in the poppet assembly retaining features. In this embodiment, the poppet assembly may further pass disc retaining features in the same manner. In this embodiment, the poppet assembly may then be rotated into an operational position prior to placing the spring against the poppet assembly 404. The operational position may include a plane of the disc of the poppet assembly being perpendicular to a direction of flow through the check valve. In an embodiment, the poppet assembly may be oriented in the operational position when inserted, and a snap ring inserted into a groove to retain the poppet assembly during use prior to placing the spring against the poppet assembly 404.

A spring is placed against the poppet assembly 404. An end of the spring may be configured to engage a feature on the poppet assembly. The spring may be inserted into the first outer piece via the open end of the first outer piece. The spring also contacts a disc that is subsequently inserted 406.

A disc is inserted 406. The disc inserted at 406 contacts the spring inserted at 404. In an embodiment, inserting the disc 406 includes rotating the disc such that the outermost edge of the disc may pass disc retaining features, such as by passing through gaps between ribs included in the disc retaining features. In this embodiment, the disc may be rotated into an operational position where the disc is held by the disc retaining features. In an embodiment where the disc retaining features include or are a snap ring, the disc may be inserted in the operational position and held within the first outer piece, and the snap ring may then be inserted and positioned within a groove, such that when the snap ring is in the groove and the disc released, the disc retaining features contact the disc.

Optionally, method 400 includes moving the disc such that it is retained further from the weld 408 than an operating position of the disc. In this optional step, the disc may be moved towards the poppet assembly and pass a welding disc retaining feature. The disc is held in that position while a pressure is applied. In an embodiment, the pressure is applied via a clamp that holds the first outer portion of the check valve during the welding 410. The pressure causes the welding disc retaining feature to be in position to apply friction or mechanical interference retaining the disc at a position further from the welding point than the disc retaining features are.

Method 400 includes welding the first outer piece to a second outer piece at a weld joint 410 to form a check valve. The weld may be a thermal weld. The thermal weld may be a thermal welding technique suitable for joining polymer materials such as, for example, fluoropolymers. In an embodiment, the thermal weld may be performed by heating the welding surfaces surrounding the openings at the ends of the first outer piece and the second outer piece, positioning the heated welding surfaces opposite one another, and pressing the welding surfaces against one another to form the weld. In an embodiment, the welding surfaces are heated on opposing sides of a heated paddle prior to performing the welding. The temperature to which the welding surfaces are heated may be a suitable welding temperature for the material or materials used at the welding surfaces. The welding of the first outer piece to the second outer piece 410 defines an internal space within the welded first and second outer pieces, which contains an internal assembly including the poppet assembly, the spring, and the disc. In an embodiment, the welding of the first outer piece to the second outer piece includes heating the welding surfaces to a temperature at or above the melting point of the material at the welding surfaces. In an embodiment, the temperature provided to the welding surfaces may be between 1250° F. and 2000° F. In an embodiment, welding the first outer piece to the second outer piece may be automated, with a machine holding the assembled first outer piece and the second outer piece, heating the welding surfaces with the paddle for a predetermined period of time, removing the paddle, and pressing the welding surfaces together.

In an embodiment, method 400 optionally includes testing flow through the first outer piece in a first direction 412 and testing flow through the first outer piece in a second direction, opposite the first 414, after inserting the disc 406 and prior to the welding 410. The first direction may be a direction from an aperture included in the first outer piece towards an opening at an opposite end of that first outer piece. The testing of flow in the first direction may be tested 412 by providing such a flow in the first direction. The check valve is functional when it permits flow in the first direction to pass through the poppet assembly, spring, and disc. The testing of flow in the second direction 414 may be tested by providing a flow in the opposite direction. The check valve Aspects:

It is understood that any of aspects 1-X can be combined with any of aspects Y-Z.

Aspect 1. A check valve including an internal passage, the check valve configured to control a fluid flow through the internal passage, the check valve comprising:
 (a) an internal assembly having,
  (i) a poppet assembly;
  (ii) a spring, contacting the poppet assembly at a first end; and
  (iii) a disc including one or more through holes, the disc contacting the spring;
 (b) a first outer piece having a first aperture and first opening opposite the first aperture;
 (c) a second outer piece having a second aperture and a second opening opposite the second aperture, wherein the first outer piece and the second outer piece are connected by a weld at the first opening and the second opening to define an internal space for retaining the internal assembly; and
 (d) a disc retaining feature located within the internal space, the retaining feature configured to selectively retain the disc in a position within the internal space away from the weld,
wherein the internal assembly is configured to obstruct a fluid flow through the internal passage in one direction and permit flow through the internal passage in an opposite direction.

Aspect 2. The check valve according to aspect 1, comprising a poppet assembly retaining feature, wherein the poppet assembly retaining feature comprises:
a plurality of retaining ribs extending from the first outer piece into the internal space, wherein the retaining ribs of the first plurality of retaining ribs are separated from one another by a first plurality of gaps, and
each of the plurality of gaps is larger than a thickness of an outermost edge of the poppet assembly.

Aspect 3. The check valve according to aspect 2, wherein the outermost edge of the poppet assembly defines a diameter that is smaller than a diameter of the internal space and larger than a distance between opposing retaining features of the plurality of retaining ribs.

Aspect 4. The check valve according to any of aspects 2-3, wherein the poppet assembly comprises a poppet and a poppet assembly disc, the poppet assembly disc includes one or more through holes, and the poppet assembly disc includes the outer edge of the poppet assembly.

Aspect 5. The check valve according to any of aspects 2-4, wherein the plurality of retaining ribs is an even number of the retaining ribs and the plurality of gaps is an even number of the gaps.

Aspect 6. The check valve according to any of aspects 1-5, wherein the disc retaining feature comprises a plurality of retaining ribs extending from the first outer piece into the internal space, wherein the retaining ribs of the second plurality of retaining ribs are separated from one another by a second plurality of gaps, and each of the second plurality of gaps is longer than a thickness of the outermost edge of the poppet assembly and a thickness of the disc.

Aspect 7. The check valve according to any of aspects 1-6, wherein the disc retaining feature comprises one or more detents formed on an inner surface of the first outer piece.

Aspect 8. The check valve according to aspect 7, wherein the detents do not allow the disc to pass when an outer surface of the first outer piece is compressed and allow the disc to pass when the outer surface of the first outer piece is not compressed.

Aspect 9. The check valve according to any of aspects 1-8, wherein the first outer piece includes an annular groove formed on an inner surface of the first outer piece.

Aspect 10. The check valve according to aspect 9, wherein the disc retaining feature is a snap ring configured to be inserted into the annular groove, wherein when the snap ring is inserted into the annular groove, the snap ring has an interior diameter that is smaller than an outer diameter of the disc.

Aspect 11. The check valve according to aspect 9, wherein the disc is configured to be inserted into the annular groove and the annular groove is the retaining feature.

Aspect 12. The check valve according to any of aspects 1-11, wherein the first outer piece, second outer piece, poppet assembly, and spring each comprise one or more fluoropolymers.

Aspect 13. A method of assembling a check valve, comprising:
inserting a poppet assembly into a first outer piece of the check valve, the first outer piece including an inlet of the check valve;
placing a spring against the poppet assembly;
inserting a disc, such that the disc contacts the spring; and
welding the first outer piece to a second outer piece at a weld joint,
wherein the disc is retained in a position away from the weld joint during the welding by one or more features of the first outer piece of the check valve.

Aspect 14. The method according to aspect 13, wherein the disc is retained by a retaining feature including a plurality of retaining ribs on an inner surface of the first outer piece, wherein during the inserting of the disc, the disc is rotated such that the outer edges of the disc pass through gaps between ribs of the plurality of retaining ribs, and the method further comprises rotating the disc such that the disc contacts the plurality of retaining ribs.

Aspect 15. The method according to aspect 14, wherein during the inserting of the poppet assembly, the poppet assembly is rotated such that the outer edges of the poppet assembly pass through gaps between ribs of the plurality of retaining ribs.

Aspect 16. The method according to aspect 15, wherein during the inserting of the poppet assembly, the poppet assembly passes a second retaining feature, the second retaining feature comprising a plurality of second retaining ribs, and the method further includes rotating the poppet assembly such that when the poppet assembly moves along the axis of the first outer piece away from the inlet of the check valve, the poppet assembly is capable of contacting the plurality of second retaining ribs.

Aspect 17. The method according to any of aspects 13-16, further comprising moving the disc such that it is retained by a plurality of retaining ribs proximal to the weld, after the welding of the first outer piece to the second outer piece.

Aspect 18. The method according to any of aspects 13-17, wherein welding the first outer piece to the second outer piece comprises thermal welding.

Aspect 19. The method according to aspect 18, wherein the thermal welding comprises:
heating a welding surface of the first outer piece using a first side of a heating paddle;
heating a welding surface of the second outer piece using a second side of the heating paddle; and
pressing the welding surface of the first outer piece and the welding surface of the second outer piece together.

Aspect 20. The method according to any of aspects 13-19, further comprising testing flow through the first outer piece in a first direction and testing flow through the first outer piece in a second direction, opposite the first, after inserting the disc and prior to the welding.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A check valve including an internal passage, the check valve configured to control a fluid flow through the internal passage, the check valve comprising:
   (a) an internal assembly having,
      (i) a poppet assembly;
      (ii) a spring, contracting the poppet assembly at a first end; and
      (iii) a disc including one or more through holes, the disc contacting the spring;
   (b) a first outer piece having a first aperture and first opening opposite the first aperture;
   (c) a second outer piece having a second aperture and a second opening opposite the second aperture, wherein the first outer piece and the second outer piece are connected by a weld at the first opening and the second opening to define an internal space for retaining the internal assembly; and
   (d) a disc retaining feature located within the internal space, the retaining feature configured to selectively retain the disc in a position within the internal space away from the weld,
   wherein the internal assembly is configured to obstruct a fluid flow through the internal passage in one direction and permit flow through the internal passage in an opposite direction, and
   wherein the disc retaining feature comprises a plurality of retaining ribs extending from the first outer piece into the internal space, wherein the retaining ribs of the plurality of retaining ribs are separated from one another by a plurality of gaps, and each of the plurality of gaps is longer than a thickness of an outermost edge of the poppet assembly and a thickness of the disc.

2. The check valve of claim 1, comprising a poppet assembly retaining feature, wherein the poppet assembly retaining feature comprises:
   a plurality of second retaining ribs extending from the first outer piece into the internal space, wherein the retaining ribs of the plurality of second retaining ribs are separated from one another by a plurality of second gaps, and
   each of the plurality of second gaps is larger than a thickness of an outermost edge of the poppet assembly.

3. The check valve of claim 2, wherein the outermost edge of the poppet assembly defines a diameter that is smaller than a diameter of the internal space and larger than a distance between opposing retaining features of the plurality of retaining ribs.

4. The check valve of claim 2, wherein the poppet assembly comprises a poppet and a poppet assembly disc, the poppet assembly disc includes one or more through holes, and the poppet assembly disc includes the outer edge of the poppet assembly.

5. The check value of claim 2, wherein the plurality of retaining ribs is an even number of retaining ribs and the plurality of gaps is an even number of gaps.

6. The check valve of claim 1, wherein the disc retaining feature comprises one or more detents formed on an inner surface of the first outer piece.

7. The check valve of claim 6, wherein the detents do not allow the disc to pass when an outer surface of the first outer piece is compressed and allow the disc to pass when the outer surface of the first outer piece is not compressed.

8. The check valve of claim 1, wherein the first outer piece, second outer piece, poppet assembly, and spring each comprise one or more fluoropolymers.

9. A method of assembling a check valve, comprising:
inserting a poppet assembly into a first outer piece of the check valve, the first outer piece including an inlet to the check valve;
placing a spring against the poppet assembly;
inserting a disc, such that the disc contacts the spring; and
welding the first outer piece to a second outer piece at a weld joint,
wherein the disc is retained in a position away from the weld joint during the welding by a retaining feature of the first outer piece of the check valve, and
wherein the disc is retained by the retaining feature including a plurality of retaining ribs on an inner surface of the first outer piece, wherein during the inserting the disc, the disc is rotated such that the outer edge passes through gaps between ribs of the plurality of retaining ribs, and the method further comprises rotating the disc such that the disc contacts the plurality of retaining ribs.

10. The method of claim 9, wherein during the inserting of the poppet assembly, the poppet assembly is rotated such that the outer edges of the poppet assembly pass through gaps between ribs of the plurality of retaining ribs.

11. The method of claim 10, wherein during the inserting of the poppet assembly, the poppet assembly passes a second retaining feature, the second retaining feature comprising a plurality of second retaining ribs, and the method further includes rotating the poppet assembly such that when the poppet assembly moves along the axis of the first outer piece away from the inlet of the check valve, the poppet assembly is capable of contacting the plurality of second retaining ribs.

12. The method of claim 9, further comprising moving the disc such that it is retained by the plurality of retaining ribs proximal to the weld, after the welding of the first outer piece to the second outer piece.

13. The method of claim 9, wherein welding the first outer piece to the second outer piece comprises thermal welding.

14. The method of claim 13, wherein the thermal welding comprises:
heating a welding surface of the first outer piece using a first side of a heating paddle;
heating a welding surface of the second outer piece using a second side of the heating paddle; and
pressing the welding surface of the first outer piece and the welding surface of the second outer piece together.

15. The method of claim 9, further comprising testing flow through the first outer piece in a first direction and testing flow through the first outer piece in a second direction, opposite the first, after inserting the disc and prior to the welding.

16. A check valve including an internal passage, the check valve configured to control a fluid flow through the internal passage, the check valve comprising:
(a) an internal assembly having,
(i) a poppet assembly;
(ii) a spring, contacting the poppet assembly at a first end; and
(iii) a disc including one or more through holes, the disc contacting the spring;
(b) a first outer piece having a first aperture and first opening opposite the first aperture;
(c) a second outer piece having a second aperture and a second opening opposite the second aperture, wherein the first outer piece and the second outer piece are connected by a weld at the first opening and the second opening to define an internal space for retaining the internal assembly; and
(d) a disc retaining feature located within the internal space, the retaining feature configured to selectively retain the disc in a position within the internal space away from the weld,
wherein the disc retaining feature comprises one or more detents formed on an inner surface of the first outer piece, and
wherein the detents do not allow the disc to pass when an outer surface of the first outer piece is compressed and allow the disc to pass when the outer surface of the first outer piece is not compressed.

* * * * *